United States Patent Office 3,386,301
Patented June 4, 1968

3,386,301
CAMSHAFT DRIVING SYSTEM FOR INTERNAL
COMBUSTION ENGINES
Mikio Koyama, 4808 Oaza Shimo-Niikura, Saitama,
Yamato-machi, Kita-adachi-gun, Japan
Filed Sept. 8, 1965, Ser. No. 485,796
Claims priority, application Japan, Sept. 16, 1964,
39/73,605
1 Claim. (Cl. 74—219)

ABSTRACT OF THE DISCLOSURE

Camshaft driving system for internal combustion engines including a crankcase with a crankshaft portion extending outside the crankcase and a toothed wheel of synthetic resin removably secured on the portion outside the crankcase. A camshaft portion also extends outside the crankcase with a synthetic timing wheel mounted for angular adjustment thereon and in alignment with the wheel on crankshaft portion. The crankshaft wheel is mounted on the crankshaft portion between belt guard plates and the plates rotate as a unit with the toothed wheel. The outer radial portion of the plates receive therebetween a radial portion of the cam wheel; and a non-metallic belt with teeth is entrained about the wheels in mesh with the teeth thereof, whereby the crankshaft wheel drives the camshaft wheel, and the angular relationship of the wheels is adjusted by angular positionment of the cam wheel on the camshaft portion.

---

This invention relates to camshaft driving systems for operating suction or intake valves and exhaust valves for internal combustion engines, and more particularly for gasoline engines.

Since the camshafts of internal combustion engines for operating valves are generally driven by transmission couplers such as gear wheels and chains in power train with the crankshafts, backlash occasioned in the transmission system generally undesired clashing noises.

Such transmission couplers are normally housed in the engine crankcases and lubricating oil in the cases is stirred, by the couplers result in a loss of power.

The object of the present invention is to eliminate such power losses and noises by the provision of a crankshaft and a camshaft having corresponding ends extended outside a crank case which possesses an oil sump, said ends being mechanically connected with each other via the transmission couplers which are made of synthetic material such as a resin and are located wholly outside said crank case. As a result, the transmission couplers are noiseless in operation and, as the transmission couplers are outside the crankcase and removed from the lubricating oil of the sump, no power loss is occasioned. The couplers provided eliminate transmission slip such that the drive timing is reliable. As the transmission members or couplers are located outside the crankcase, the assemblage is readily accessible and the timing can be adjusted by merely changing mutual relative angular positions of the transmission coupler which are respectively fixed to the crankshaft and camshaft.

In the following description, the present invention is described by way of example in connection with the accompanying drawings, in which FIG. 1 is a partial longitudinal sectional view of an combustion engine embodying the present invention.

Figure 1:
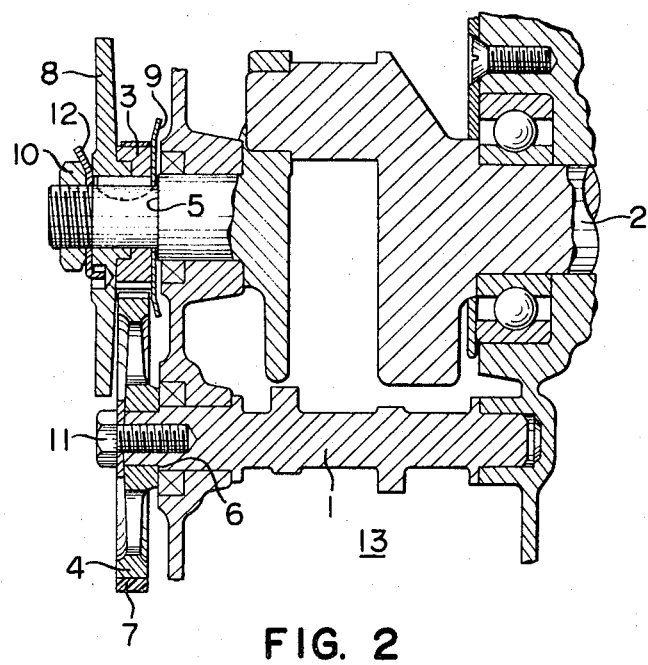
Figure 2:
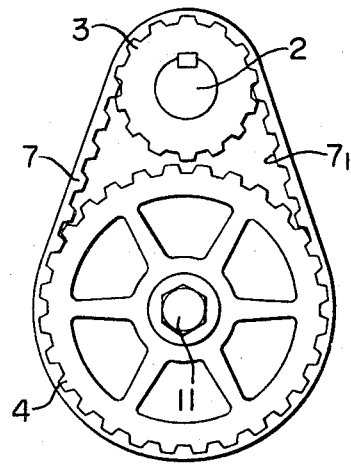
FIG. 2 is a front view of an essential portion of the invention.

FIGS. 1 and 2 represent an example of this invention, wherein a belt 7 of synthetic resin is used for driving the camshaft, and each one end of a crankshaft 2 and the camshaft 1 are projected outside the crankcase 13. The free ends of said shafts are mounted respectively with a toothed timing pulley 3 and camshaft pulley 4 so that they engage with corresponding stepped portions 5 and 6 of the shafts 2 and 1 which are arranged in parallel in a vertical plane.

The belt 7 is an unstretchable belt made of synthetic resin which has its inner peripheral surface formed with teeth 7; The teeth 7 mesh with those provided around the outer surfaces of the pulleys 3 and 4. Plates 8 and 9 are provided on shaft 2 for preventing the belt from disengaging axially, the plates being disposed on opposite sides of the pulley 3. Said plate members are rigidly fixed together with the pulley 3 in one body with the shaft 2, by screwing a nut 10 on said shaft 2, while the pulley 4 is fixed on the shaft 1 with a bolt 11. The belt 7 is preferably a steel wire cored nylon belt without stretch, 12 is a lock washer for preventing the nut 10 from loosening.

As the teeth for both pulleys 3 and 4 are oriented in such a way as referred to above, the toothed belt 7 may be driven over said pulleys without making metallic sounds. In addition, since the crankshaft-to-camshaft transmission couplers are placed outside the crank case, no stirring takes place in the lubricating oil O, FIG. 4 of the crank case 13, and accordingly, power-loss of the engine from such turbulence is avoided. As the belt 7 is not stained with oil, no slip occurs and, as a result, the drive is positively transmitted. Furthermore, as the pulley 3 is designed to be of clamping type as referred to above, not only is the assembly simple, but also the timing can be freely adjusted by merely loosening the bolt 11, and changing the relative angular position of the pulley 4 with respect to pulley 3. Further, as compared with usual driving mechanisms, the patent invention is capable of low cost manufacturing.

Figure 3:
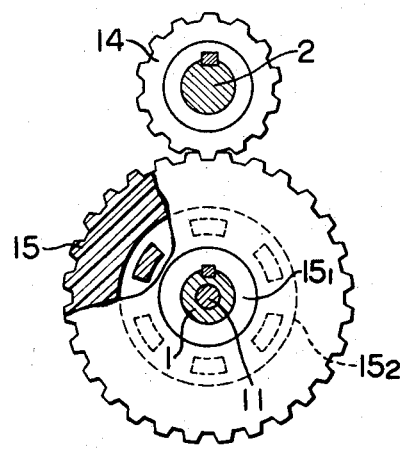
FIG. 3 is a front view of a modification.

FIG. 3 represents modification, wherein both the timing pulley 14 and camshaft pulley 15 are synthetic resin gear wheels, which are designed to be directly engaged with each other. As compared with the example of FIGS. 1 and 2, the belt 7 is eliminated, and the construction can be made simpler with other functions and effects being the same. The gear wheel 15 is made of synthetic resin and has a boss $15_1$ and a rib member $15_2$, respectively, made of metal, which are preferably molded into one body. The gear wheel 14 is similarly molded.

Figure 4:
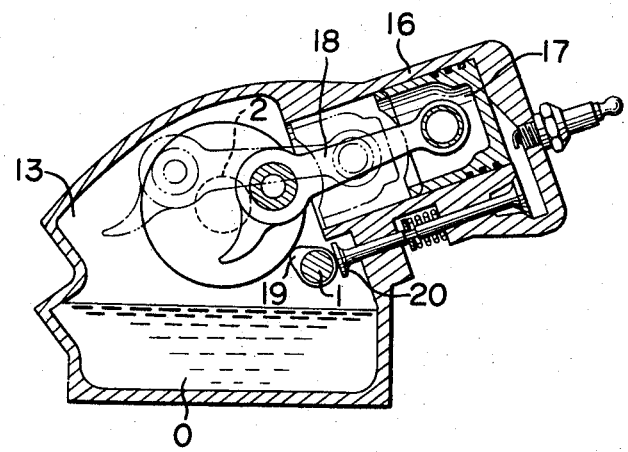
FIG. 4 is a longitudinal sectional view of one example of internal combustion engines to which the present invention is applied.

Referring to FIG. 4, illustrating a section of the internal combustion engine to which the present invention is applied, 16 is a cylinder, while 17 is a piston, 18 a crank rod, 19 a cam and 20 a tappet. The present invention will be more clearly understood when the crankshaft 2 and camshaft 1 of FIG. 1 are considered in driving and driven relationship, respectively, by the transmission couplers shown either in FIGS. 1 and 2 and FIG. 3 as described hereinbefore.

What I claim is:

1. In an internal combustion engine having a camshaft and a crankshaft mounted for rotation within a crankcase and each having portions extending outside the crankcase at one end thereof, a camshaft driving system comprising a crankshaft toothed wheel removably secured on the portion of the crankshaft outside the crankcase, metallic plates mounted on the crankshaft portion with one on each side of the wheel and of greater diameter than said wheel, a toothed timing wheel removably mounted and angularly adjustable on the camshaft portion, the camshaft wheel being in alignment with the camshaft wheel and spaced therefrom with its outer radial portion received spacially between the plates, and a toothed belt entrained about the wheels in mesh with the teeth thereof and being received spacially between the plates, the plates and crankshaft wheel being rotatable as a unit, the belt and wheels being of synthetic material, and the plates confining the toothed belt in a path about the toothed wheels.

References Cited

UNITED STATES PATENTS

| | | | |
|---|---|---|---|
| 2,397,312 | 3/1946 | Forrest | 74—216.5 |
| 3,169,408 | 2/1965 | Rouverol | 74—461 |
| 3,216,267 | 11/1965 | Dolza | 74—219 |
| 3,237,469 | 3/1966 | Berry et al. | 74—243 |
| 3,304,795 | 2/1967 | Rouverol | 74—461 |

OTHER REFERENCES

Machine Design, volume 33, No. 3, Feb. 2, 1961, pp. 148 and 150.

FRED C. MATTERN, JR., *Primary Examiner.*

J. A. WONG, *Assistant Examiner.*